(12) United States Patent
Takeo

(10) Patent No.: US 9,548,615 B2
(45) Date of Patent: Jan. 17, 2017

(54) SHOVEL AND CONTROL METHOD OF SHOVEL

(71) Applicant: SUMITOMO(S.H.I.) CONSTRUCTION MACHINERY CO., LTD., Tokyo (JP)

(72) Inventor: Jitsutaka Takeo, Chiba (JP)

(73) Assignee: SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/452,622

(22) Filed: Aug. 6, 2014

(65) Prior Publication Data
US 2014/0346775 A1 Nov. 27, 2014

Related U.S. Application Data

(63) Continuation of application No. PCT/JP2013/052508, filed on Feb. 4, 2013.

(30) Foreign Application Priority Data

Feb. 17, 2012 (JP) .................. 2012-033259

(51) Int. Cl.
H02J 7/00 (2006.01)
B60W 20/00 (2016.01)
(Continued)

(52) U.S. Cl.
CPC ............ H02J 7/0014 (2013.01); B60W 20/00 (2013.01); E02F 3/32 (2013.01); E02F 3/435 (2013.01);
(Continued)

(58) Field of Classification Search
CPC ...................................... H02J 7/0016
(Continued)

(56) References Cited

U.S. PATENT DOCUMENTS 7,973,534 B2 * 7/2011 Tatebayashi et al. ......... 324/433
8,928,282 B2 * 1/2015 Kudo et al. .................... 320/118
(Continued)

FOREIGN PATENT DOCUMENTS

JP 2008-109764 5/2008
JP 2009-201320 9/2009
(Continued)

OTHER PUBLICATIONS

International Search Report mailed on Apr. 16, 2013.

Primary Examiner — Richard Isla Rodas
Assistant Examiner — Johali Torres Ruiz
(74) Attorney, Agent, or Firm — IPUSA, PLLC

(57) ABSTRACT

A shovel includes: an engine generating a drive power; a generator performing a generating operation using the drive power transmitted from the engine; an electric accumulator having a plurality of electric storage cells in which an electric power generated by the generator is accumulated, the electric accumulator supplying an electric power to an electric load of the shovel; and an equalizing circuit provided to each of the electric storage cells and including a discharge resistor and a switching circuit in order to equalize capacitances of the electric storage cells. A determination is made as to whether to activate the equalizing circuit based on a variation in outputs of the electric storage cells.

7 Claims, 11 Drawing Sheets

(51) Int. Cl.
*E02F 9/20* (2006.01)
*H01M 10/42* (2006.01)
*H01M 10/44* (2006.01)
*H01M 10/48* (2006.01)
*E02F 3/32* (2006.01)
*H02K 7/00* (2006.01)
*H02K 7/18* (2006.01)
*E02F 3/43* (2006.01)
*E02F 9/26* (2006.01)

(52) U.S. Cl.
CPC ........... *E02F 9/2075* (2013.01); *E02F 9/2091* (2013.01); *E02F 9/267* (2013.01); *H01M 10/425* (2013.01); *H01M 10/441* (2013.01); *H01M 10/482* (2013.01); *H02J 7/0016* (2013.01); *H02J 7/0021* (2013.01); *H02K 7/006* (2013.01); *H02K 7/1815* (2013.01); *B60W 2300/17* (2013.01); *H01M 10/486* (2013.01); *H01M 2010/4278* (2013.01)

(58) Field of Classification Search
USPC ........................................................ 320/122
See application file for complete search history.

(56) References Cited

U.S. PATENT DOCUMENTS

| | | | |
|---|---|---|---|
| 2010/0283434 A1* | 11/2010 | Kakiuchi | H02J 7/0016 320/166 |
| 2012/0293127 A1 | 11/2012 | Higashi et al. | |
| 2012/0326725 A1* | 12/2012 | Sugeno et al. | 324/429 |
| 2013/0057305 A1* | 3/2013 | Jimbo | B60L 11/005 324/750.01 |
| 2013/0093400 A1* | 4/2013 | Maynard | H02J 7/0016 320/166 |
| 2013/0110430 A1* | 5/2013 | Nishi | H01M 10/48 702/63 |

FOREIGN PATENT DOCUMENTS

| | | | |
|---|---|---|---|
| JP | 2010-071905 | 4/2010 | |
| JP | 2010-213417 | 9/2010 | |
| JP | 2011-036046 | 2/2011 | |
| WO | 2011/096290 | 8/2011 | |
| WO | WO 2012006115 A2 * | 1/2012 | ............ H02J 7/0016 |

* cited by examiner

SHOVEL AND CONTROL METHOD OF SHOVEL

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2013/052508 filed on Feb. 4, 2013, designating the U.S., which claims priority based on Japanese Patent Application No. 2012-033259 filed on Feb. 17, 2012. The entire contents of each of the foregoing applications are incorporated herein by reference.

BACKGROUND

Technical Field

The present invention relates to a shovel provided with an electric accumulator as a drive power source.

Description of Related Art

In many cases, a capacitor is used as an electric accumulator provided in a shovel. Because a large capacity and a high-voltage are required for a capacitor used in a shovel or the like, a single capacitor is formed by many capacitor cells (hereinafter, simply referred to as cells) being connected to each other.

SUMMARY

According to an aspect of the present invention, there is provided a shovel including: an engine generating a drive power; a generator performing a generating operation using the drive power transmitted from the engine; an electric accumulator having a plurality of electric storage cells in which an electric power generated by the generator is accumulated, the electric accumulator supplying an electric power to an electric load of the shovel; and an equalizing circuit provided to each of the electric storage cells and including a discharge resistor and a switching circuit in order to equalize capacitances of the electric storage cells, wherein a determination is made as to whether to activate the equalizing circuit based on a variation in outputs of the electric storage cells.

According to another aspect of the present invention, there is provided a control method of a shovel including: an engine generating a drive power; a generator performing a generating operation using the drive power transmitted from the engine; an electric accumulator having a plurality of electric storage cells in which an electric power generated by the generator is accumulated, the electric accumulator supplying an electric power to an electric load of the shovel; and an equalizing circuit provided to each of the electric storage cells and including a discharge resistor and a switching circuit in order to equalize capacitances of the electric storage cell, the control method including: determining whether there is a variation in outputs of the electric storage cells; and activating the equalizing circuit based on a result of the determination with respect to the variation.

DETAILED DESCRIPTION

In a capacitor in which many cells are connected, when the cells are deteriorated, a variation is generated in the capacitances of the cells. If a charge/discharge of the capacitor is repeated when a variation is generated in the capacitances of the cells, a load to some of the cells having a large degree of deterioration is further increased. Thus, a variation in the capacitances of the cells becomes larger, which results in a further reduction in the capacitances of the cells having a large degree of deterioration. Accordingly, the capacitance of the entire capacitor (that is, an amount of electric charge), which is a sum of the capacitances of a plurality of cells, is reduced, which causes a problem in that an internal resistance of the capacitor is increased.

Thus, an equalizing function is activated at a certain point for some of cells having a state of charge (SOC) greater than or equal to a predetermined value so as to perform an equalization of a state of charge of the plurality of cells. The equalizing function is a function of causing a cell having a state of charge greater than a predetermined value to forcibly discharge until the state of charge becomes the predetermined value. In order to give the equalizing function to the capacitor, an equalizing circuit having the equalizing function is provided to the capacitor itself.

If such an equalization of a state of charge of cells mentioned above is performed, cells having a high state of charge are caused to forcibly discharge, which results in a waste of expressly accumulated electric power.

A description will now be given of an embodiment with reference to the drawings.

Figure 1:
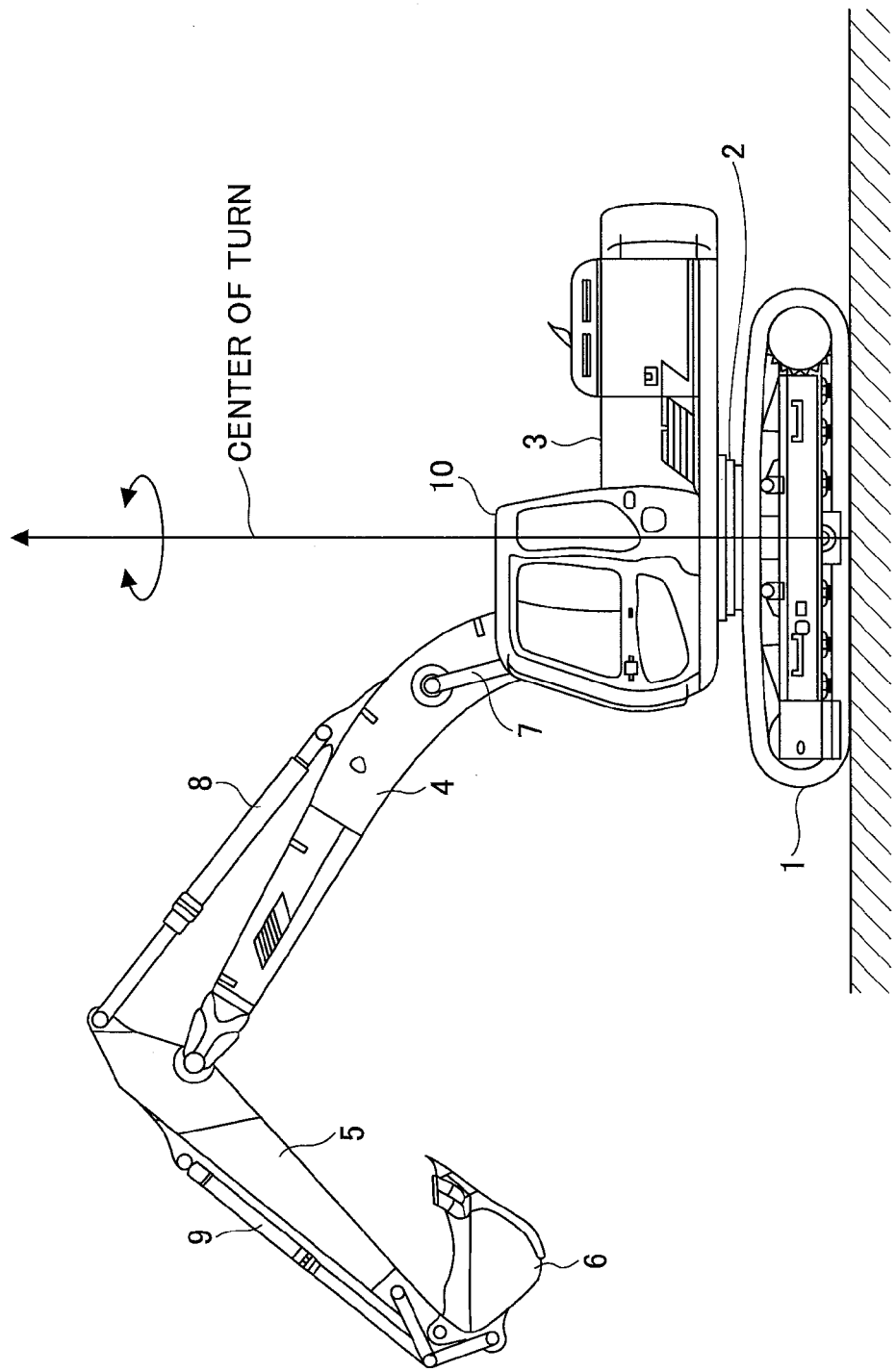
FIG. 1 is a side view of a hybrid shovel.

FIG. 1 is a side view of a hybrid shovel according to an embodiment. Although the shovel illustrated in FIG. 1 is a hybrid shovel, the present invention is not limited to the hybrid shovel and is applicable to a shovel of any type if it is equipped with an electric accumulator as a drive power source of an electric load.

As illustrated in FIG. 1, an upper-part turning body 3 is mounted, via a turning mechanism 2, on a lower-part running body 1 of the hybrid shovel. The upper-part turning body 3 is provided with a boom 4, an arm 5 and a bucket 6. The upper-part turning body 3 is also provided with a boom cylinder 7, an arm cylinder 8 and a bucket cylinder 9 for hydraulically driving the boom 4, the arm 5 and the bucket 6, respectively. Additionally, a cabin 10 and a drive power source are mounted on the upper-part turning body 3.

Figure 2:
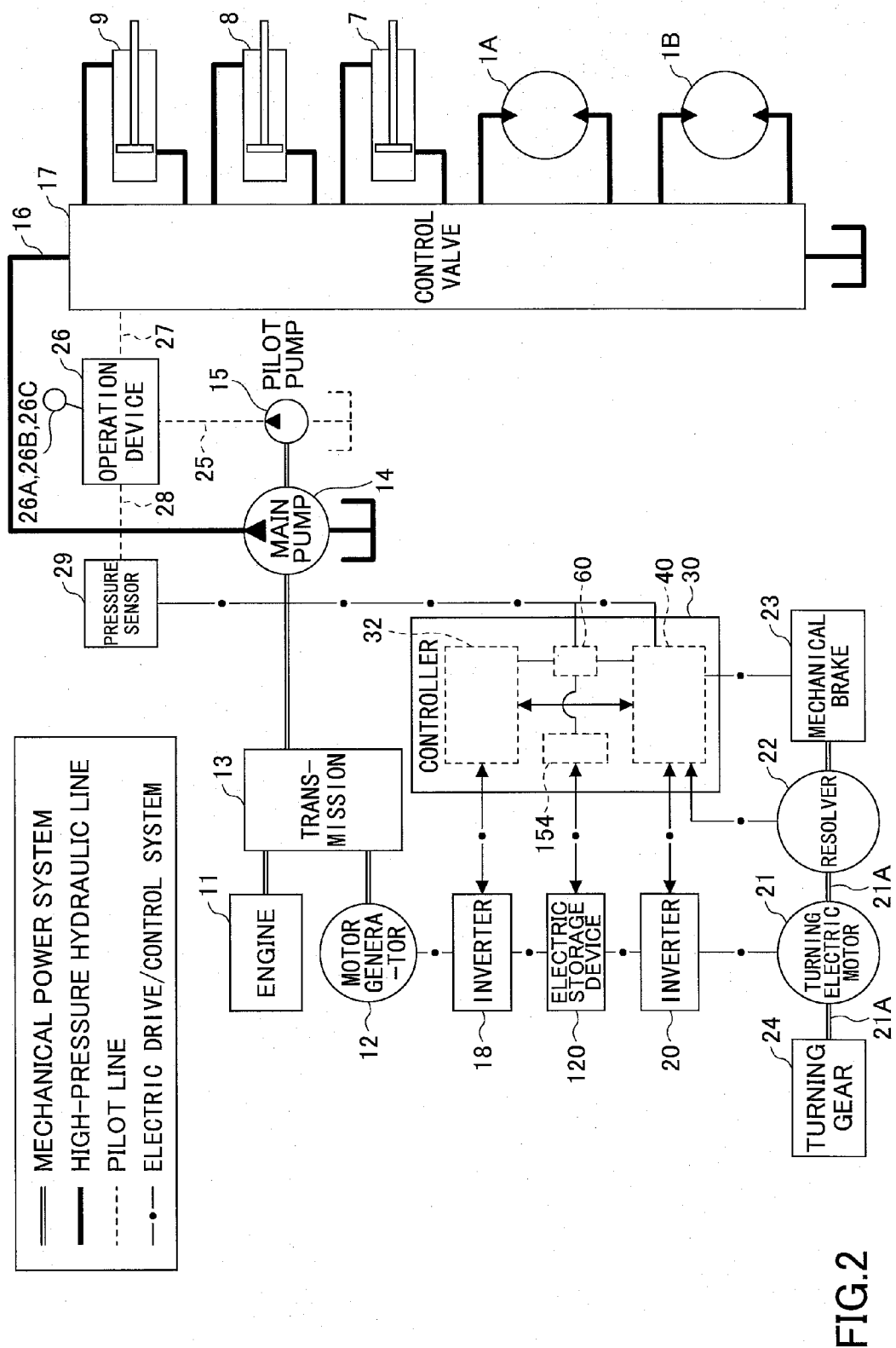
FIG. 2 is a block diagram illustrating a configuration of a drive system of a hybrid shovel according to an embodiment.

FIG. 2 is a block diagram illustrating a configuration of a drive system of the hybrid shovel. In FIG. 2, a double line denotes a mechanical drive line, a solid line denotes a high-pressure hydraulic line, a dotted line denotes a pilot line, and a single-dashed chain line denotes an electric drive/control line.

An engine 11 as a mechanical drive part and a motor generator 12 as an assist drive part are connected to two input axes of a transmission 13, respectively. A main pump 14 and a pilot pump 15 are connected to an output axis of the transmission 13. A control valve 17 is connected to the main pump 14 via a high-pressure hydraulic line 16.

The control valve 17 is a control device that controls a hydraulic system. The control valve 17 is connected with hydraulic motors 1A (for the right side) and 1B (for the left side), the boom cylinder 7, the arm cylinder 8 and the bucket cylinder 9 through high-pressure hydraulic lines.

An electric storage device 120 including a capacitor or a battery for storing electric power is connected to the motor generator 12 via an inverter 18. In the present embodiment it is assumed that the electric storage device 120 includes a capacitor 19 as an electric accumulator. A turning electric motor 21 is connected to the electric storage device 120 through an inverter 20. Instead of using the capacitor as an electric accumulator, a rechargeable secondary battery such as a lithium ion battery or a power source of other forms, which is capable of transferring electric power, may be used.

A resolver 22, a mechanical brake 23 and a turning gear 24 are connected to a rotation axis 21A of the turning electric motor 21. Additionally, an operation device 26 is connected to the pilot pump 15 through a pilot line 25.

The operation device 26 is connected with the controller 17 and a pressure sensor 29 as a lever operation detecting part through hydraulic lines 27 and 28, respectively. The pressure sensor 29 is connected with a controller 30, which performs a drive control of an electric system.

The inverter 18 is provided between the motor generator 12 and the electric storage device 120 as mentioned above. The inverter 18 performs a control of operation of the motor generator 12 based on an instruction from the controller 30. Thereby, when the inverter 18 is controlling a power running operation of the motor generator 12, an electric power required by the motor generator 12 is supplied from the electric storage device 120 to the motor generator 12. On the other hand, when controlling a regenerative operation of the motor generator 12, an electric power generated by the motor generator 12 is stored or accumulated in the capacitor 19 of the electric storage device 120.

The electric storage device 120 is provided between the inverter 18 and the inverter 20. Thereby, when either one of the motor generator 12 and the turning electric motor 21 is performing a power running operation, the electric storage device 120 supplies an electric power necessary for the power running operation. Additionally, when either one of the motor generator 12 and the turning electric motor 21 is performing a regenerative operation, the electric storage device 120 accumulates a regenerative electric power generated by the regenerative operation as an electric energy.

The inverter 20 is provided between the turning electric motor 21 and the electric storage device 120 as mentioned above, and controls an operation of the turning electric motor 21 based on an instruction from the controller 30. Thereby, when the inverter 20 is controlling a power running operation of the turning electric motor 21, an electric power required by the turning electric motor 21 is supplied from the electric storage device 120 to the turning electric motor 21. On the other hand, when the turning electric motor 21 is performing a regenerative operation, an electric power generated by the turning electric motor 21 is accumulated in the capacitor 19 of the electric storage device 120.

It should be noted that a charge/discharge control of the capacitor 19 of the electric storage device 120 is performed by the controller 30 based on a charged state of the capacitor 19, an operating state (a power running operation or a regenerative operation) of the motor generator 12 and an operating state (a power running operation or a regenerative operation) of the turning electric motor 21.

The controller 30 is a control device performing a drive control of the shovel. The controller 30 includes a drive control device 32, an electric turning control device 40, a main control part 60 and a capacitance computing part 154. The controller 30 is configured by an operation processing device including a CPU (Central Processing Unit) and an internal memory. The drive control device 32, the electric turning control device 40 and the main control part 60 are realized by the CPU of the controller 30 executing programs stored in the internal memory.

A velocity instruction converting part (not illustrated in the figure) is an operation processing part to convert a signal input from the pressure sensor 29 into a velocity instruction. Thereby, an amount of operation of a lever 26A is converted into a velocity instruction (rad/s) for rotationally driving the turning electric motor 21. The velocity instruction is input to the drive control device 32, the electric turning control device 40 and the main control part 60.

The drive control device 32 performs an operation control (switching between a power running operation and a regenerative operation) of the motor generator 12 and a charge/discharge control of the capacitor 19. The drive control device 32 switches a power running operation and a regenerative operation of the motor generator 12 in accordance with a load of the engine 11 and a charged state of the capacitor 19. The drive control device 32 performs the charge/discharge control of the capacitor 19 through the inverter 18 by switching between the power running operation and the regenerative operation of the motor generator 12.

Figure 3:
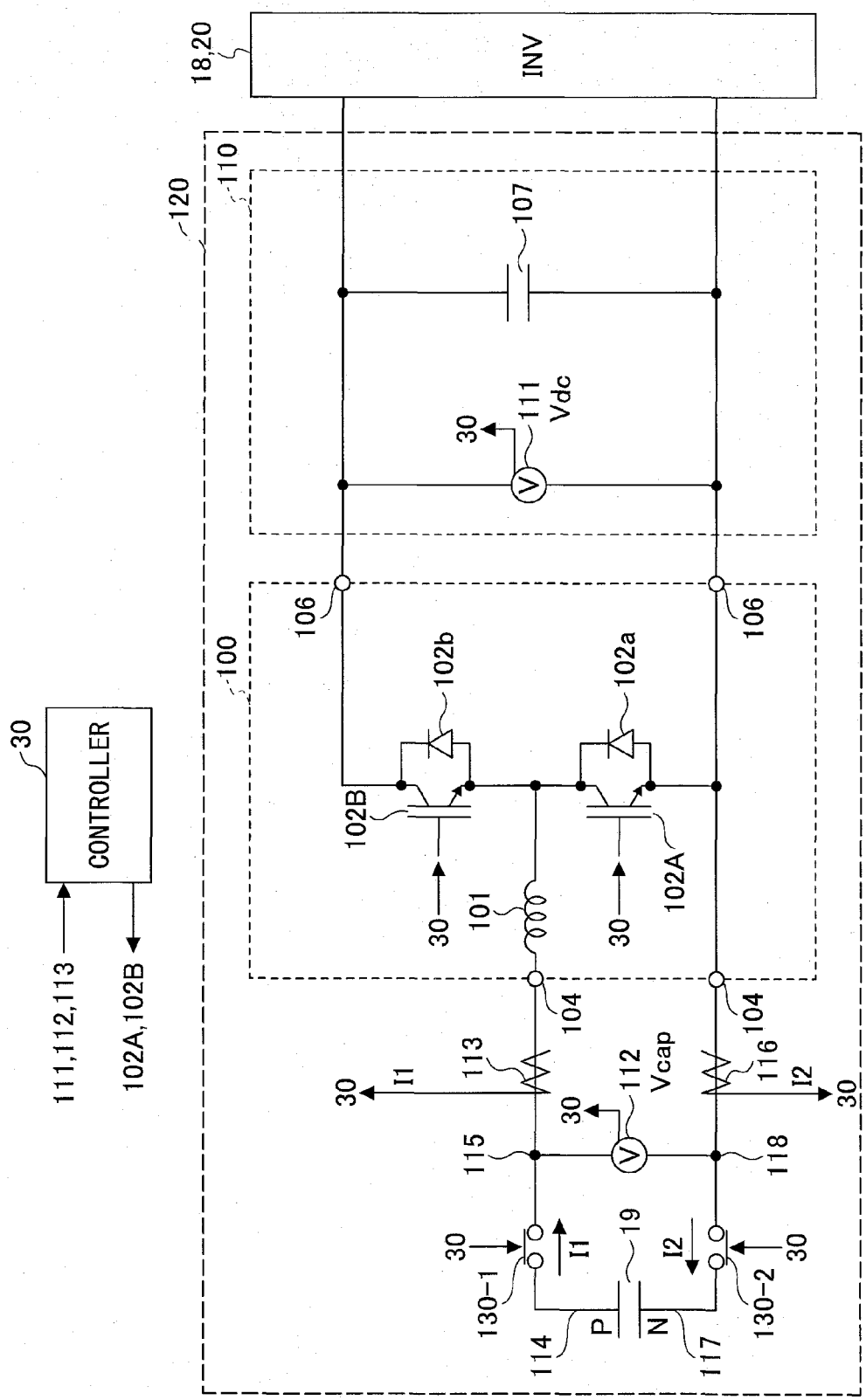
FIG. 3 is a circuit diagram of an electric storage device.

FIG. 3 is a circuit diagram of the electric storage device 120. The electric storage device 120 includes the capacitor 19 as an electric accumulator, an up/down voltage converter 100 and a DC bus 110. The DC bus 110 controls transfer of an electric power between the capacitor 19, the motor generator 12 and the turning electric motor 21. The capacitor 19 is provided with a capacitor voltage detecting part 112 for detecting a capacitor voltage value and a capacitor current detecting part 113 for detecting a capacitor current value. The capacitor voltage value and the capacitor current value detected by the capacitor voltage detecting part 112 and the capacitor current detecting part 113 are supplied to the controller 30.

The up/down voltage converter 100 performs a control of switching a voltage-up operation and a voltage-down operation in accordance with operating states of the motor generator 12 and the turning electric motor 21 so that a DC bus voltage value falls within a fixed range. The DC bus 110 is arranged between the inverters 18 and 20 and the up/down voltage converter 100, and performs transfer of an electric power between the capacitor 19, the motor generator 12 and the turning motor 21.

The switching control between the voltage-up operation and the voltage-down operation of the up/down voltage converter 100 is carried out based on the DC bus voltage value detected by the DC bus voltage detecting part 111, the capacitor voltage value detected by the capacitor voltage detecting part 112, and the capacitor current value detected by the capacitor current detecting part 113.

In the above-described configuration, an electric power generated by the motor generator 12, which is an assist motor, is supplied to the DC bus 110 of the electric storage device 120 via the inverter 18, and, then, supplied to the capacitor 19 via the up/down voltage converter 100. The regenerative electric power obtained by the regenerative operation of the turning electric motor 21 is supplied to the DC bus 110 of the electric storage device 120 via the inverter 20, and, then, supplied to the capacitor 19 via the up/down voltage converter 100.

The up/down voltage converter 100 includes a reactor 101, a voltage-up IGBT (Insulated Gate Bipolar Transistor) 102A, a voltage-down IGBT 102B, a pair of power supply connection terminals 104 for connecting the capacitor 19, a pair of output terminals 106 for connecting the DC bus 110, and a smoothing capacitor 107 connected in parallel to the pair of output terminals 106. The DC bus 110 is connected between the output terminals 106 of the up/down voltage converter 100 and the inverters 18 and 20.

One end of the reactor 101 is connected to the midpoint of the voltage-up IGBT 102A and the voltage-down IGBT 102B, and the other end is connected to the power supply connection terminal 104. The reactor 101 is provided to supply an induced electromotive force that is generated upon switching ON/OFF the voltage-up IGBT 102A to the DC bus 110.

Each of the voltage-up IGBT 102A and the voltage-down IGBT 102B is configured by a bipolar transistor in which a MOSFET (Metal Oxide Semiconductor Field Effect Transistor) is incorporated into a gate portion. Each of the voltage-up IGBT 102A and the voltage-down IGBT 102B is a semiconductor device (switching element) that is capable of high-speed switching of a large electric power. Each of the voltage-up IGBT 102A and the voltage-down IGBT 102B is driven by the controller 30 applying a PWM voltage to a gate terminal. Diodes 102a and 102b, which are rectifier elements, are connected in parallel to the voltage-up IGBT 102A and the voltage-down IGBT 102B, respectively.

The capacitor 19 may be a chargeable/dischargeable electric accumulator that enables transfer of electric power between the capacitor 19 and the DC bus 110 via the up/down voltage converter 100. It is noted that although the capacitor 19 is illustrated as an electric accumulator in FIG. 3, a chargeable/dischargeable secondary battery such as a lithium ion battery, a lithium ion capacitor, or a power supply of another form that can transfer an electric power may be used instead of the capacitor 19.

The power supply connection terminals 104 and the output terminals 106 are terminals to which the capacitor 19 and the inverters 18 and 20 are connectable. The capacitor voltage detecting part 112 for detecting a capacitor voltage value is connected between the pair of power supply connection terminals 104. The DC bus voltage detecting part 111 for detecting a DC bus voltage value is connected between the pair of output terminals 106.

The capacitor voltage detecting part 112 detects a voltage value Vcap of the capacitor 19. The DC bus voltage detecting part 111 detects a voltage value Vdc of the DC bus 110. The smoothing capacitor 107 is an electric storage element for smoothing the DC bus voltage and is inserted between the positive-electrode terminal and the negative-electrode terminal of the output terminals 106. The voltage of the DC bus 110 is maintained at a predetermined voltage by the smoothing capacitor 107.

The capacitor current detecting part 113 is a detector for detecting a value of a current flowing through the capacitor 19 on a positive-electrode terminal (P terminal) side of the capacitor 19, and includes a resistor for detecting current. That is, the capacitor current detecting part 113 detects a current value I1 of the current flowing through the positive-electrode terminal of the capacitor 19. On the other hand, a capacitor current detecting part 116 is a detection part for detecting a value of a current flowing through the capacitor 19 at a negative-electrode terminal (N terminal) side of the capacitor 19, and includes a resistor for detecting current. The capacitor current detecting part 116 detects a current value I2 of the current flowing through the negative-electrode terminal of the capacitor 19.

When raising the voltage of the DC bus 110 by the up/down voltage converter 100, a PWM voltage is applied to the gate terminal of the voltage-up IGBT 102A, and an induced electromotive force generated at the reactor 101 in response to switching ON/OFF the voltage-up IGBT 102A is supplied to the DC bus 110 through the diode 102b connected in parallel to the voltage-down IGBT 102B. Thereby, the voltage of the DC bus 110 is raised.

When lowering the voltage of the DC bus 110 by the up/down voltage converter 100, a PWM voltage is applied to the gate terminal of the voltage-down IGBT 102B. Thereby, a regenerative electric power supplied via the voltage-down IGBT 102B is supplied from the DC bus 110 to the capacitor 19. Accordingly, the capacitor 19 is charged by the electric power stored in the DC bus 110, and the voltage of the DC bus 110 is lowered.

In the present embodiment, a relay 130-1 is provided to a power supply line 114 connecting the positive-electrode terminal of the capacitor 19 to the power supply connection terminal 104 of the up/down voltage converter 100. The relay 130-1 is a breaker capable of breaking the power supply line 114. The relay 130-1 is arranged between a connection point 115 of the capacitor voltage detecting part 112 to the power supply line 114 and the positive-electrode terminal of the capacitor 19. The relay 130-1 is operated by a signal from the controller 30 and is capable of breaking the power supply line 114 extending from the capacitor 19. Thereby, the capacitor 19 is disconnected from the up/down voltage converter 100.

Also, a relay 130-2 is provided to a power supply line 117 connecting the negative-electrode terminal of the capacitor 19 to the power supply connection terminal 104 of the up/down voltage converter 100. The relay 130-2 is a breaker capable of breaking the power supply line 114. The relay 130-2 is arranged between a connection point 118 of the capacitor voltage detecting part 112 to the power supply line 117 and the negative-electrode terminal of the capacitor 19. The relay 130-2 is operated by a signal from the controller 30 and is capable of breaking the power supply line 117 extending from the capacitor 19. Thereby, the capacitor 19 is disconnected from the up/down voltage converter 100. It should be noted that the capacitor may be disconnected by simultaneously breaking the power supply line 114 on the positive-electrode terminal side and the power supply line 117 on the negative-electrode terminal side by integrating the relay 130-1 and the relay 130-2 into a single relay.

Although a drive part, which generates the PMW signal for driving the voltage-up IGBT 102A and the voltage-down IGBT 102B, actually exists between the controller 30 and the voltage-up IGBT 102A and the voltage-down IGBT 102B, illustrations are omitted in FIG. 3. Such a drive part can be realized by an electronic circuit or an operation processing device.

Figure 4:
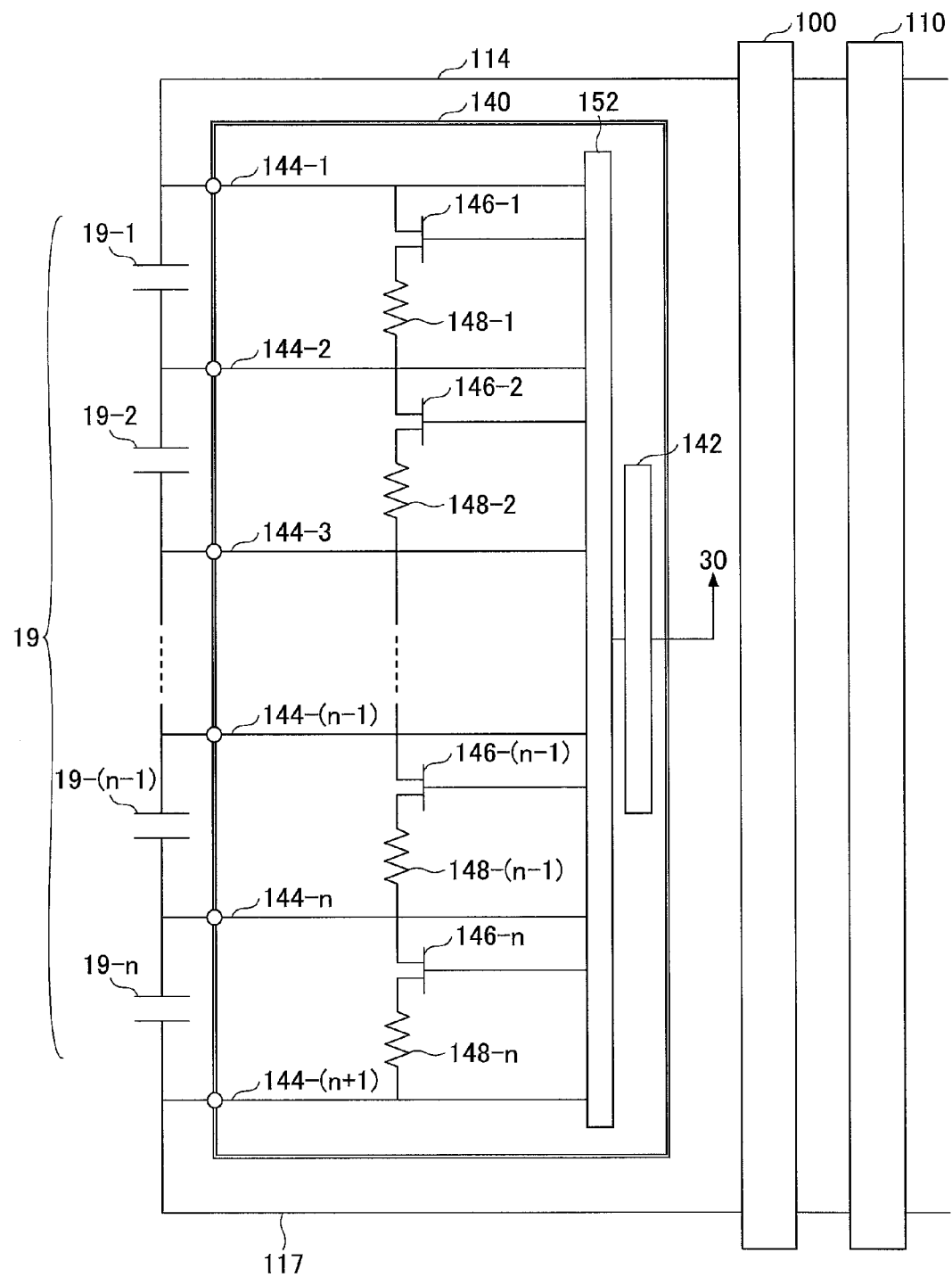
FIG. 4 is a circuit diagram illustrating a configuration of a capacitor.

FIG. 4 is a circuit diagram illustrating a structure of the capacitor 19. As illustrated in FIG. 4, the capacitor 19 as an electric accumulator actually includes a capacitor control circuit 140 and n pieces of capacitor cells 19-1 through 19-n (n is an integer greater than or equal to 2) as a plurality of electric storage parts. Hereinafter, the capacitor cell may be referred to as an electric storage cell, or simply referred to as a cell. The capacitor control circuit 140 has a capacitance measuring function for measuring a capacitance of each cell 19-n and an equalizing function to equalize the capacitance of each cell 19-n. Although all the cells 19-1 through 19-n are connected in series in the present embodiment for the sake of convenience of explanation, the cells connected in series may be set to one group and a plurality of groups may be connected in parallel. Hereinafter, all of the cells 19-1 through 19-n may be collectively referred to as cells 19-n, and each cell may be referred to as the cell 19-n for the sake of convenience.

Opposite ends of each cell 19-n are connected to a voltage detecting part 152 in the capacitor control circuit 140. Specifically, for example, one of the electrodes of the cell 19-1 is connected to the voltage detecting part 152 by a wiring 144-1, and the other of the electrodes is connected to the voltage detecting part 152 by a wiring 144-2. Similarly, one of the electrodes of the cell 19-n is connected to the voltage detecting part 152 by a wiring 144-n, and the other of the electrodes is connected to the voltage detecting part 152 by a wiring 144-(n+1). The voltage detecting part 152 is connected to a capacitance computing part 154 of the controller 30 through an interface 142.

A balancing FET (Field Effect Transistor) 146-1 and a discharge resistor 148-1 are connected in series (in parallel to the cell 19-1) between the wiring 144-1 and the wiring 144-2. A gate of the balancing FET 146-1 is connected to the voltage detecting part 152. Similarly, balancing FET (Field Effect Transistor) 146-n and a discharge resistor 148-n are connected in series (in parallel to the cell 19-n) between the wiring 144-n and the wiring 144-(n+1). A gate of the balancing FET 146-n is connected to the voltage detecting part 152.

Figure 5:
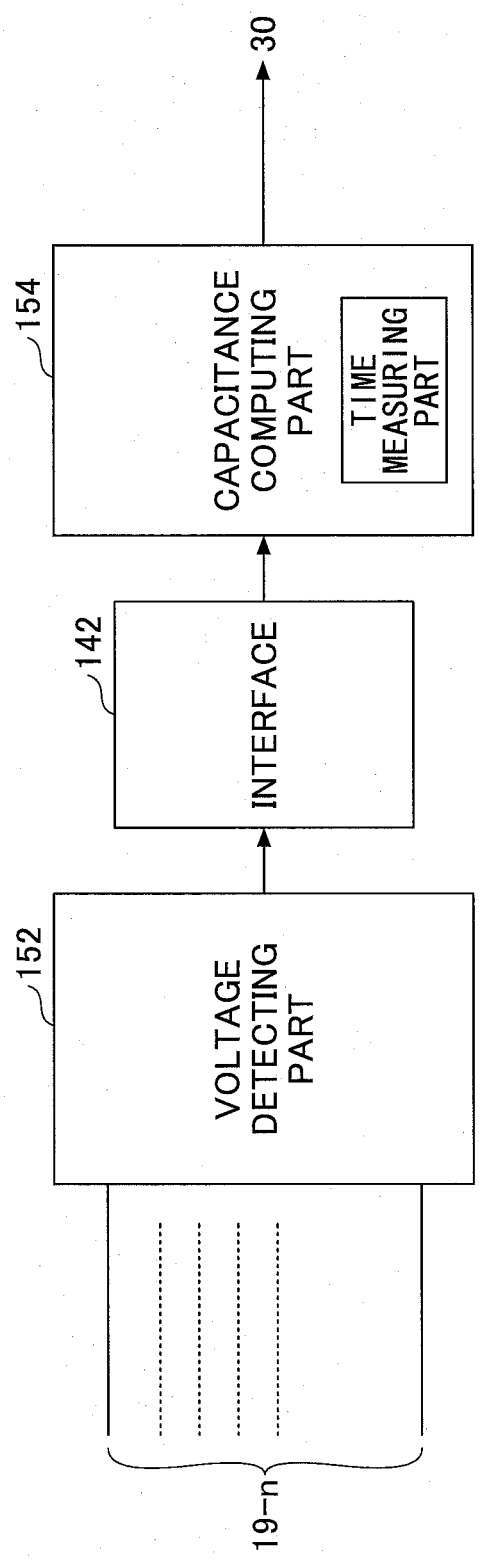
FIG. 5 is a functional block diagram of a part computing a capacitance.

In the above-mentioned structure, the capacitance computing part 154 can measure a capacitance of each cell 19-n individually. FIG. 5 is a block diagram for explaining a function relating to a computation of capacitance.

The computation of a capacitance is performed by the voltage detecting part 152, which measures a voltage across terminals of each cell 19-n, and the capacitance computing part 154, which computes a capacitance based on the voltage detected by the voltage detecting part 152. As mentioned above, the capacitance is a computed value using the detected voltage, and is an output of each electric storage cell.

The voltage detecting part 152, when a voltage detection instruction is given, detects a voltage across terminals of each cell 19-n (hereinafter, the voltage across terminals is referred to as cell voltage Vn), and sends the detected cell voltage Vn of each cell 19-n to the capacitance computing part 154 through the interface 142. For example, the cell voltage V1 of the cell 19-1 can be detected as a voltage difference between the wiring 144-1 and the wiring 144-2. The cell voltage Vn of the cell 19-n can be detected as a voltage difference between the wiring 144-n and the wiring 144-(n+1).

The capacitance computing part 154 computes a capacitance Cn of each cell based on the value of the cell voltage Vn of each cell 19-n sent from the voltage detecting part 152 through the interface 142. The computation of the capacitance Cn is performed as follows.

First, the capacitance computing part 154 detects a cell voltage $Vn0$ of the cell 19-n of which a capacitance Cn is to be computed at a time when the computation of the capacitance Cn is started. Then, the capacitance computing part 154 causes the cell 19-n to discharge by short-circuiting the cell 19-n by sending a signal to the gate of the balancing FET 146-n to close the balancing FET 146-n (set in an ON state). Because the discharge resistor 148-n is provided in the short-circuiting path, a discharge current of the cell 19-n is a minute current. Accordingly, the cell voltage Vn of the cell 19-n due to the discharge decreases not rapidly but gradually. After causing the cell 19-n to discharge for a predetermined time period T, which is measured by a time measuring part included in the capacitance computing part 154, the cell voltage $Vn1$ at that time is detected. The capacitance Cn of the cell 19-n can be computed according to the following formula (1). That is, the capacitance can be used as an index of a deterioration determination.

$$Cn = -T/(R1+R2) \times In^{-1}\{(R1+R2)/R2 \times Vn1/Vn0\}$$

Here, R1 is an internal resistance of the cell 19-n, and R2 is an internal resistance of the discharge resistance 148-n. However, because R1<<R2, R1 is ignored and the following formula (1) is derived.

$$Cn = -T/R2 \times In^{-1}(Vn1/Vn0) \qquad (1)$$

A degree of deterioration of the present cell 19-n can be determined by comparing the computed capacitance Cn of the cell 19-n with a previously acquired initial capacitance Cn0 of the cell 19-n (a capacitance of the cell 19-n before use).

When deterioration of the cells progresses, the capacitance is decreased and the internal resistance is increased. If the capacitance and the internal resistance vary between the cells, the cell voltage also tends to vary. Accordingly, even when the same current is caused to flow, a variation is generated in the voltage between the cells. As a result, a deteriorated cell is further deteriorated. Thus, it is desired to positively equalize the voltage of each cell in response to a variation in the deterioration of the cells.

Thus, in the present embodiment, equalization of the cell voltage is performed by determining a degree of deterioration of the cell 19-n based on the computed present capacitance Cn of each cell 19-n and causing the cell to discharge, only when it is necessary, by activating the function of the equalization circuit in response to the degree of deterioration.

Figure 6:
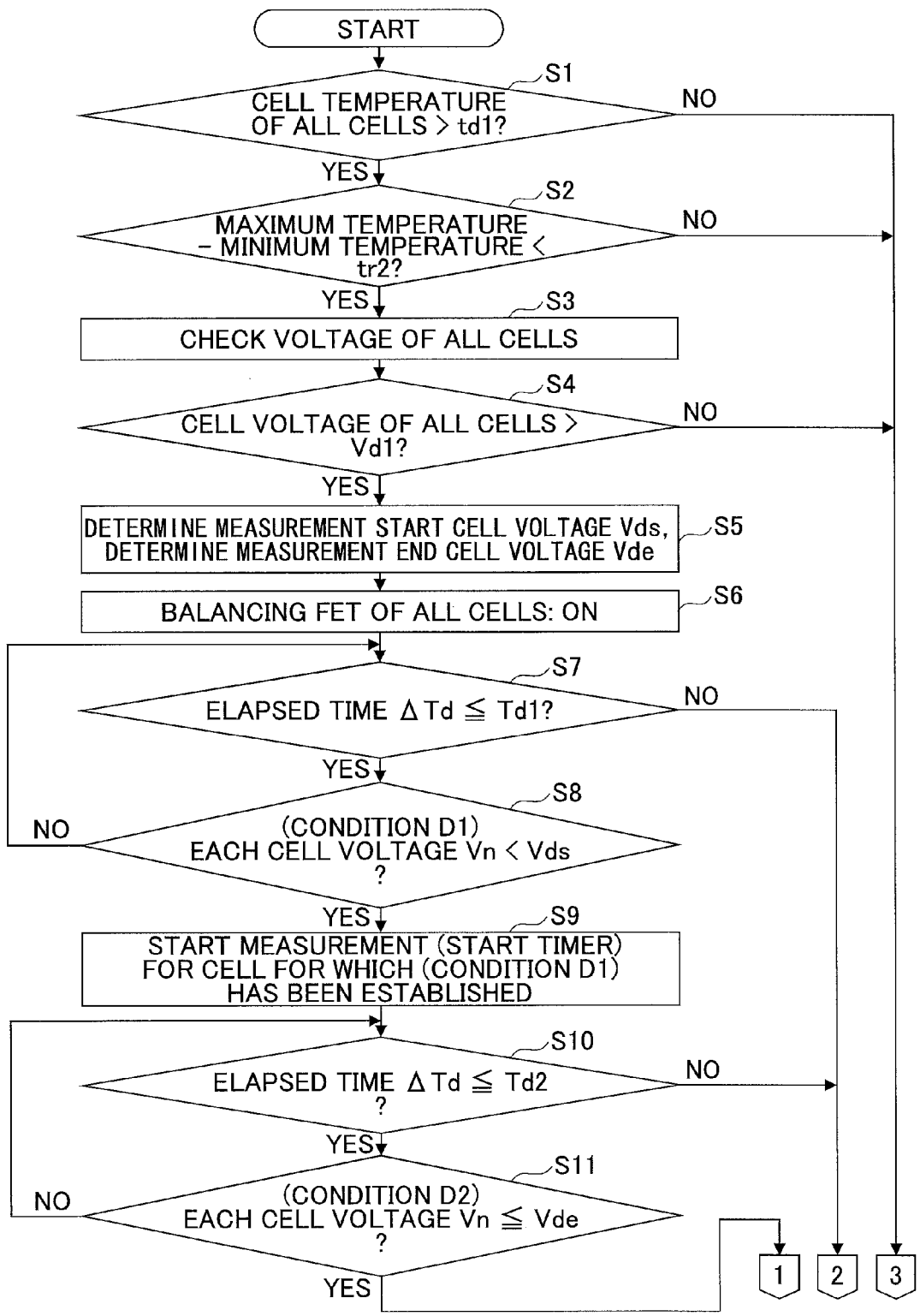
FIG. 6 is a part of a flowchart of a process of computing a capacitance and equalizing a voltage.
Figure 7:
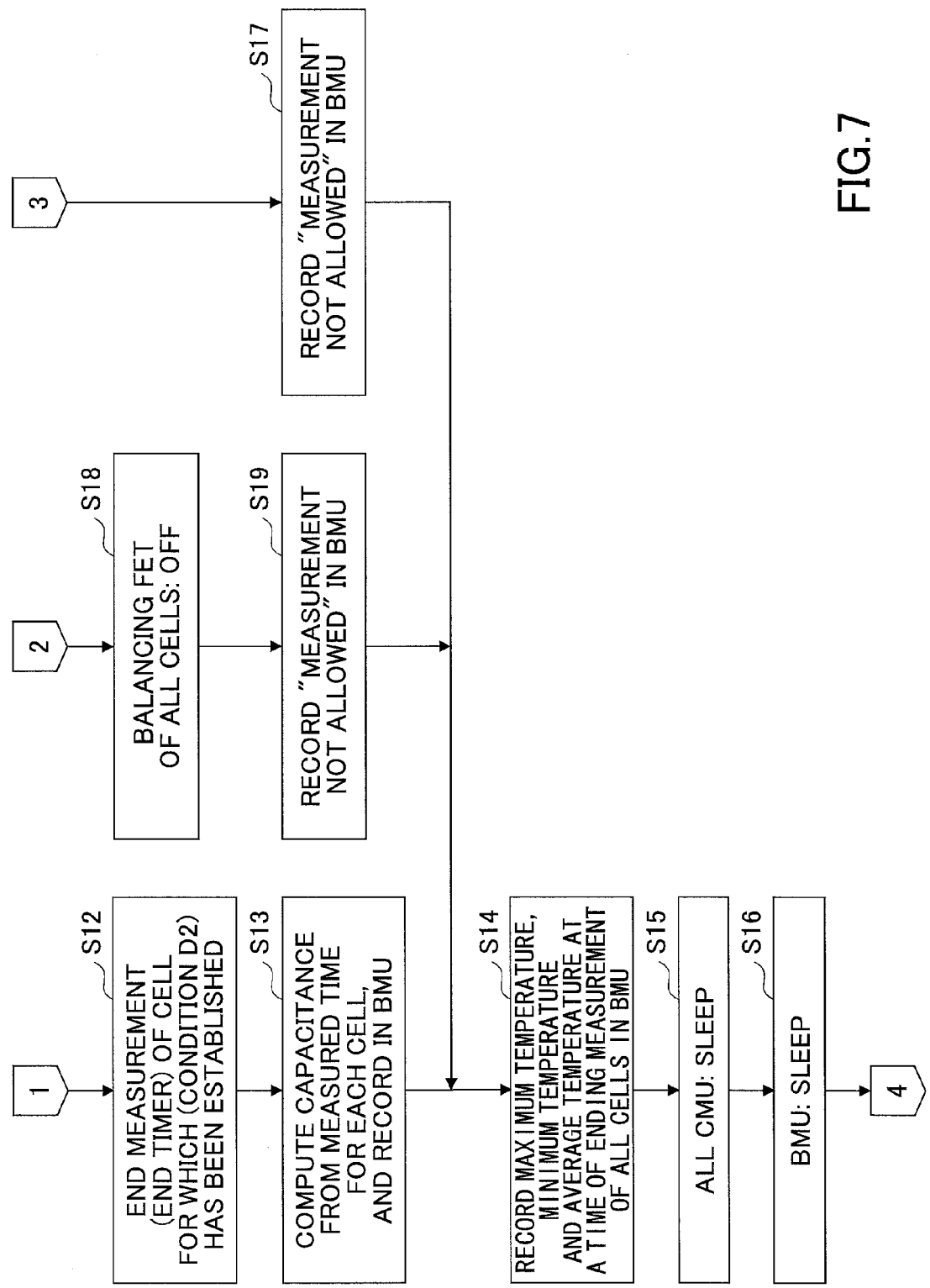
FIG. 7 is a part of a flowchart of a process of computing a capacitance and equalizing a voltage.
Figure 8:
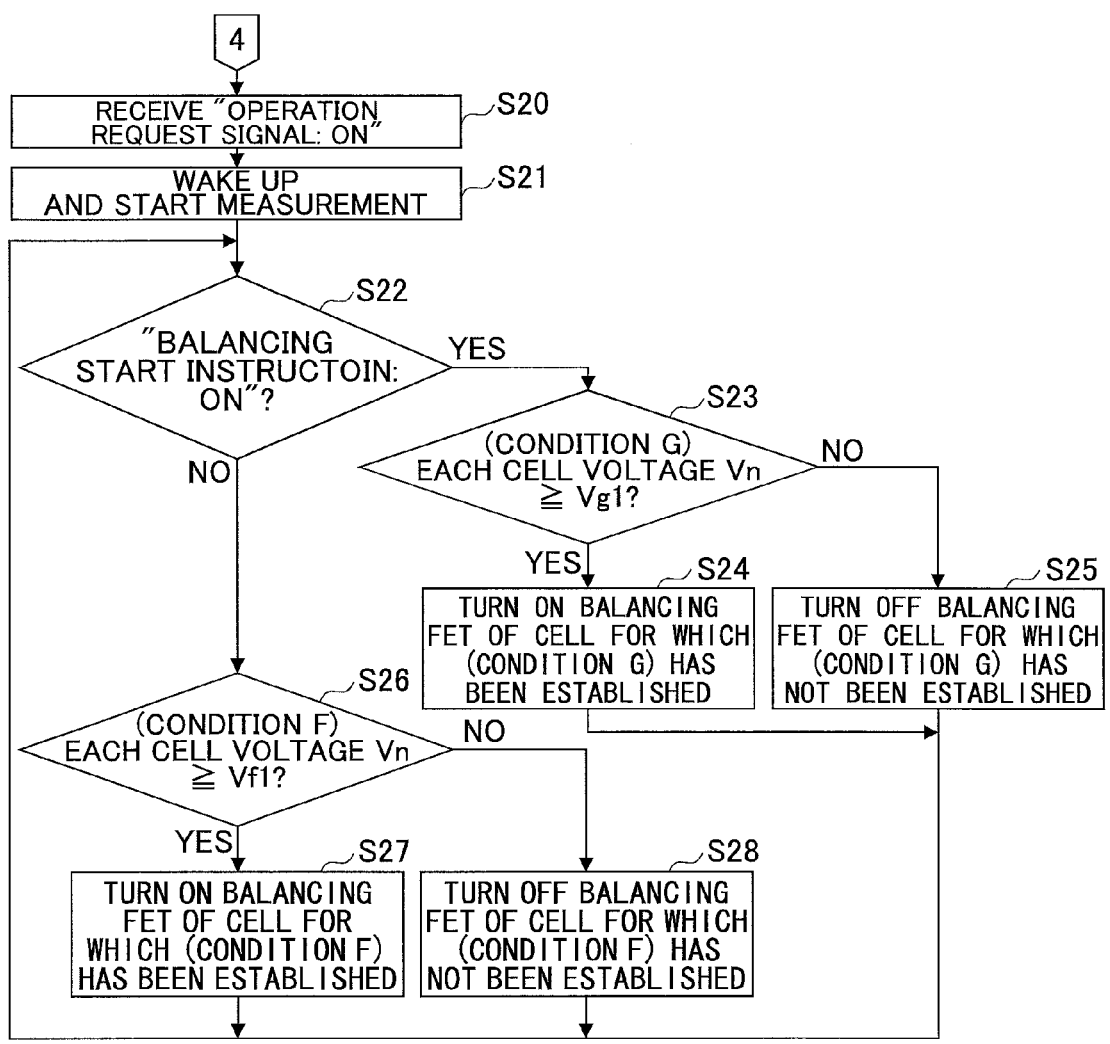
FIG. 8 is a part of a flowchart of a process of computing a capacitance and equalizing a voltage.

Next, a description is given, with reference to the flowchart illustrated in FIG. 6 through FIG. 8, of a capacitance computing process of computing a capacitance, which is an output of each cell, and a voltage equalizing process of lowering a cell voltage of a deteriorated cell.

First, a description is given of a configuration to manage an operation and a process with respect to the capacitor 19. The cell voltage of each cell 19-n is managed by a cell monitoring unit (CMU: a capacitor control circuit 140) provided in the capacitor 19. The CMU is provided to each cell 19-n, and is managed by a battery management unit (BMU) which manages the capacitor 19. The BMU is provided in the controller 30 of the shovel. Additionally, the BMU is equipped with the capacitance computing part 154.

Although the BMU and the CMU can be activated upon receipt of power supply from the capacitor 19 even when the shovel is not operated, in order to reduce a power consumption of the capacitor 19, the EMU and the CMU are set to be in a sleep state when the shovel is not operated.

The capacitance computing process is started when the shovel is not operated due to, for example, key-off (the key of the shovel is turned to a non-operating position) in a state where there is no input/output of a current to the capacitor. That is, the capacitance computing process is started in a state where no charge/discharge current flows in each cell 19-n of the capacitor 19.

Then, a condition determining process is performed to determine whether a condition for determining a variation is appropriate. First, in step S1, it is determined whether or not temperatures of all of the cells 19-n are higher than a measurement start determination temperature td1(step S1).

If temperatures of all of the cells 19-n are not higher than td1, that is, if at least one of the cells has a temperature lower than or equal to the measurement start determination temperature td1, it is determined that a condition according to which the capacitance computing process can be performed has not been established yet, and the process proceeds to step S17 (refer to FIG. 7). In step S17, information indicating "measurement not allowed" is stored in the memory of the EMU.

On the other hand, if it is determined in step S1 that the temperatures of all of the cells 19-n are higher than the measurement start determination temperature td1, the process proceeds to step S2. In step S2, it is determined whether a difference between the maximum temperature and the minimum temperature from among the temperatures of the cells 19-n is lower than a temperature-variation determination temperature range tr2.

If the difference between the maximum temperature and the minimum temperature is not lower than tr2, that is, if the difference between the maximum temperature and the minimum temperature is higher than or equal to the temperature-variation determination temperature range tr2, it is determined that a condition according to which the capacitance computing process can be performed has not been established yet, and the process proceeds to step S17 (refer to FIG. 7).

On the other hand, if it is determined that the difference between the maximum temperature and the minimum temperature is lower than tr2, the process proceeds to step S3.

Figure 9:
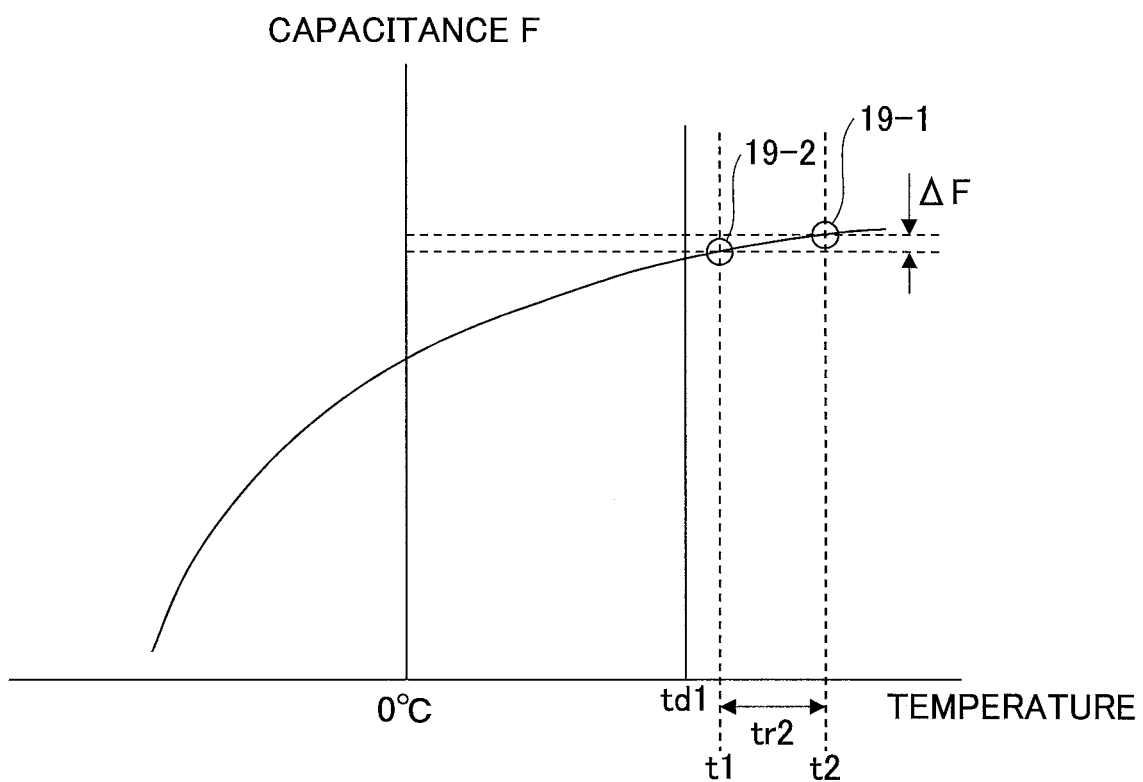
FIG. 9 is a graph indicating a relationship between a capacitance of a cell and a temperature of the cell.

The reason for determining in step S1 whether the temperatures of all of the cells 19-n are higher than the measurement start determination temperature td1 is according to a relationship between the capacitance and the measured temperature of the cells as illustrated in FIG. 9. That is, the capacitance of the cell becomes smaller as the temperature of the cell goes down, and because a change in the capacitance is excessively large relative to a change in the temperature in an area where the temperature of the cell is lower than a predetermined temperature, a variation in the capacitance due to a change in the temperature becomes large. Thus, in the present embodiment, the measurement of the cell voltage is started in a state where the temperature of the cell is not too low, and the temperature is set to the measurement start determination temperature td1.

Additionally, there is a variation in temperature between a plurality of cells arranged in the capacitor 19, and, thus, if the temperature of the cell becomes large, a calculation error ΔF of the capacitance becomes large. Because if, for example, the temperature of one cell 19-1 in the capacitor 19 is t1 and the temperature of another cell 19-2 is t2 in FIG. 9, the capacitance of the cell 19-1 is changed. Therefore, in the present embodiment, the measurement of the cell voltage is started only when it is determined in step S2 that the difference between the maximum temperature and the minimum temperature of the cells is lower than the predetermined temperature difference range tr2 so as to compute the capacitance. That is, the measurement of the cell voltage is started only when the temperatures of all of the cells 19-n fall within the predetermined temperature difference range tr2.

In step S3, the cell voltages of all of the cells 19-n are detected. Consequently, it is determined in step S4 whether the cell voltages of all of the cells 19-n are higher than a measurement start determination cell voltage Vd1. If the cell voltages of all of the cells 19-n are not higher than the measurement start determination cell voltage Vd1, that is, if there is at least one cell of which cell voltage is lower than or equal to the measurement start determination cell voltage Vd1, it is determined that a condition according to which the capacitance computing process can be performed has not been established yet, and the process proceeds to step S17 (refer to FIG. 17).

On the other hand, if it is determined in step S4 that the cell voltages of all of the cells 19-n are higher than the measurement start determination cell voltage Vd1, the process proceeds to step S5. In step S5, a cell voltage Vds for starting measurement and a cell voltage Vde for ending measurement are determined. The cell voltage Vds for starting measurement is determined to be a minimum value Vdmin of the cell voltages of all cells. The cell voltage Vde for ending measurement is determined to be a value obtained by subtracting a difference Vd2 between the measurement start voltage and the measurement end voltage from the minimum value Vdmin of the cell voltages of all cells (Vde=Vdmin−Vd2).

Consequently, in step S6, measurement (detection) of the cell voltages is started by sending a signal to gates of the balancing FETs 146-n of all cells 19-n to close (turn ON) the balancing FETs 146-n.

Next, it is determined in step S7 whether an elapsed time ΔTd from a time at which the balancing FETs 146-n are turned on is shorter than or equal to a time period Td1 until the measurement of the cell voltages is started. If the elapsed time ΔTd from the time at which the balancing FETs 146-n are turned on is not shorter than or equal to a time period Td1 until the measurement of the cell voltages is started, that is, if the elapsed time ΔTd from the time at which the balancing FETs 146-n are turned on is longer than the time period Td1 until the measurement of the cell voltages is started, it is determined that a condition according to which the capacitance computing process can be performed has not been established yet, and the process proceeds to step S18 (refer to FIG. 17). In step S18, the balancing FETs 146-n of all cells 19-n are turned OFF. Consequently, in step S19, information indicating "measurement not allowed" is stored in a memory of the EMU.

On the other hand, if it is determined in step S7 that the elapsed time ΔTd from the time at which the balancing FETs 146-n are turned on is shorter than or equal to the time period Td1 until the measurement of the cell voltages is started, the process proceeds to step S8 sequentially from the cell of which elapsed time ΔTd is shorter than or equal to Td1. In step S8, a determination condition whether cell voltage Vn of the cell 19-n is lower than the measurement start cell voltage Vds (Vn<Vds) is set to a condition D1.

If it is determined in step S8 that the cell voltage Vn of the cell 19-n is not lower than the measurement start cell voltage Vds, that is, if it is determined that the cell voltage Vn of the cell 19-n is higher than or equal to the measurement start cell voltage Vds, the process returns to step S7, and the cell voltage of a next cell 19-n is checked in step S8.

On the other hand, if it is determined in step S8 that the cell voltage Vn of the cell 19-n is lower than the measurement start cell voltage Vds, the process proceeds to step S9 sequentially from the cell of which cell voltage Vn is lower than Vds. In step S9, a measurement of the elapsed time is started with respect to a cell to which the condition D1 of step S8 has been established. As mentioned above, the determinations of step S7 to step S9 are performed for each cell. Thus, if it is determined in the determination of step S7 that the time elapsed time ΔTd of one cell is longer than Td1, the process proceeds to step S19 even when the process for other remaining cells reaches step S9, and information indicating "measurement not allowed" is stored in the memory of the BMU.

As mentioned above, consumption of the cell voltage by the CMU can be limited by defining the time period from a time at which the balancing FETs 146-n of all cells 19-n are closed (turned ON) until a time at which the measurement is started even when the measurement cannot be started due to a large variation in the cell voltages.

Consequently, it is determined in step S10 whether the elapsed time ΔTd is shorter than or equal to a time period Td2 until the measurement is ended. The elapsed time ΔTd is a time period from the time at which turning on the balancing FETs of all cells 19-n is instructed until the time at which the measurement of the cell voltage is ended. The elapsed time ΔTd is a previously set time period.

If it is determined that the elapsed time ΔTd is not shorter than or equal to the time period Td2 until the measurement is ended, that is, if it is determined that the elapsed time ΔTd is longer than the time period Td2 until the measurement is ended, the process proceeds to step S18. In step S18, the balancing FETs 146-n for all of the cells 19-n are turned off. Then, in step S19, information indicating "measurement not allowed" is stored in the memory of the BMU.

On the other hand, if it is determined in step S10 that the elapsed time ΔTd is shorter than or equal to the cell voltage measurement end time period Td2, the process proceeds to step S11 sequentially from the cell of which elapsed time ΔTd is shorter than or equal to Td2. In step S11, it is determined whether the cell voltage Vn of each cell 19-n is lower than or equal to the measurement end cell voltage Vde. This determination condition Vn≤Vde? is set to a "condition D2". If the cell voltage Vn of each cell 19-n is not lower than or equal to the measurement end cell voltage Vde, that is, if the cell voltage Vn of each cell 19-n is higher than the measurement end cell voltage Vde, the process returns to step S10, and it is determined again whether the elapsed time ΔTd is shorter than or equal to the voltage measurement end time period Td2.

On the other hand, if it is determined in step S11 that the cell voltage of each cell 19-n is shorter than or equal to the measurement end cell voltage Vde determined in step S5, the process proceeds to step S12 (refer to FIG. 7) sequentially from the cell of which the cell voltage Vn is lower than or equal to Vde.

Figure 10:
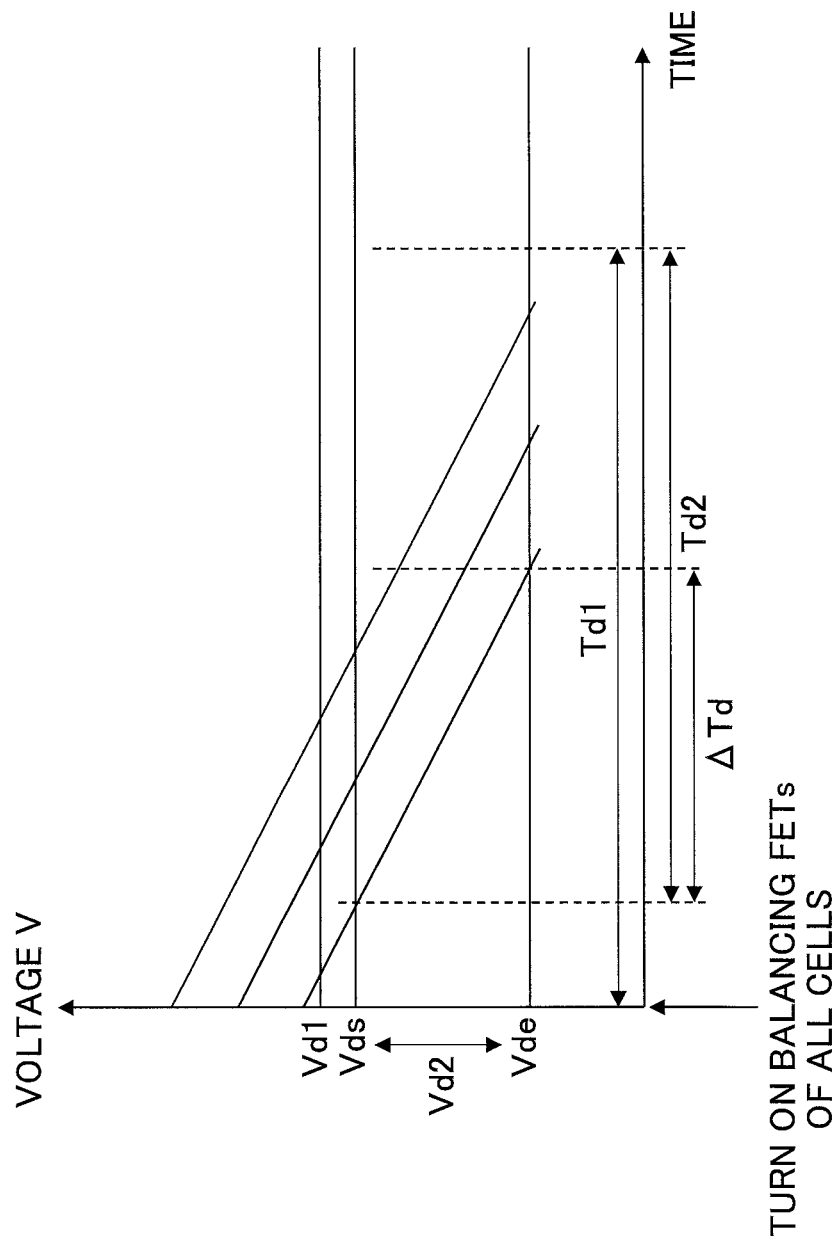
FIG. 10 is a graph indicating a relationship between a cell voltage and a discharge time.

In the above-mentioned process, the measurement of the cell voltage is started when the cell voltage Vn of all of the cell 19-n are higher than or equal to the predetermined voltage (Vds). As illustrated in FIG. 10, when a plurality of cells are caused to discharge through a fixed discharge resistor, the voltage of the cell having a lower cell voltage is decreased faster than the cell having a higher cell voltage because a decreasing rate of the cell voltage is substantially the same. Because the deterioration of the cells is accelerated if the cell voltage is decreased too much, it is necessary to maintain the cell voltages of all of the cells to be higher than or equal to a predetermined voltage even when the measurement of the cell voltage is performed. In step S5, the predetermined voltage is determined to be the cell voltage Vde to end the measurement. That is, the measurement start cell voltage Vds is determined so that the cell voltage Vde at the time of ending the measurement does not go below the lower limit voltage when the cell having the lowest cell voltage is caused to discharge for the elapsed time ΔTd.

Next, the variation determining process is performed. In step S12, the measurement of the cell voltage Vn for the cell of which (condition 2) has been established is ended. Next, in step S13, the capacitance Cn of the cell 19-n is computed based on the measurement time to for each cell, and the computed value of the capacitance Vn is stored in the memory of the BMU. The calculation of the capacitance is performed according to the above-mentioned formula (1). Alternatively, the calculation can be made by the following formula (2).

$$Cn=-tn/\{R \times In(Vde/Vds)\}+Ic \times tn/(Vds-Vde) \quad (2)$$

Here, R is a discharge resistance (Ω) of the cell 19-n, and Ic is a consumed current (A) of the CMU.

After the process of step S3 is ended, the process proceeds to step S14. It should be noted that also the process proceeds to step S14 after the process of step S17 and the step S19 is ended.

In step S14, a maximum temperature, a minimum temperature and an average temperature of those temperatures of the cells 19-n at the time the measurement of the cell voltages of all of the cells 19-n is ended are computed, and are stored in the memory of the BMU. Then, the CMUs of all of the cells 19-n are set in a sleep state in step S15 and the BMU is set in a sleep state in step S16 so as to stop the operations of the CMU and the BMU to reduce a power consumption of the CMU and the BMU. Accordingly, after the step S16 is ended, the process by the BMU and the CMU is temporarily stopped until an operation of shovel is started.

As mentioned above, according to the above-mentioned process, the capacitances of the plurality of cells 19-n can be computed for each cell. Accordingly, a degree of deterioration of the cell can be known based on the computed capacitance, and balancing of the cell voltage is positively activated in response to a variation in the deterioration. Here, when a difference between the maximum value and the minimum value of the capacitance computed for each cell is larger than a predetermined threshold value, it is determined that there is a variation in the cell capacitance of the plurality of cells 19-n. If it is determined that there is a variation, an instruction to start the balancing is output from the controller 30. Here, the determination of existence of the variation may be performed using not the difference between the maximum value and the minimum value of the capacitance but an average value or the like.

After the process illustrated in FIG. 6 and FIG. 7 is ended and the BMU and the CMU are set in a sleep state, the equalizing process (balancing process) illustrated in FIG. 8 is performed at a timing of restarting the operation of the shovel by key-on.

First, in step S20, the BMU receives an operation request signal ON from the main control part 60 of the shovel in response to the key-on, and sends the operation request signal ON to the CMU. Then, in step S21, the BMU and the CMU transit from the sleep state to an operating state and start the measurement of the cell voltage.

Next, in step S22, it is determined whether a balancing start instruction signal is ON. The balancing start instruction signal ON is a signal for performing a process of causing each cell 19-n to discharge until a predetermined voltage is reached by activating the equalizing function.

If it is determined in step S22 that the balancing start instruction signal is ON, the process proceeds to step S23. In step S23, it is determined whether the cell voltage Vn of each cell 19-n is higher or equal to a voltage Vg1 at which the balancing FET 148-n is forcibly turned on. This determination condition is set to a condition G. If the cell voltage Vn of each cell 19-n is higher or equal to a voltage Vg1 at which the balancing FET 148-n is forcibly turned ON, the process proceeds to step S24. In step S24, the balancing FET 148-n provided to the cell 19-n for which condition G has been established is turned on so as to cause the cell 19-n concerned to forcibly discharge to reduce the cell voltage.

On the other hand, if it is determined in step S23 that the condition G has not been established, the process proceeds to step S25. In step S25, the balancing FET 148-n provided to the cell 19-n for which the condition G has not been established is turned off so that the discharge of the cell 19-n concerned is not performed. That is, when the cell voltage Vn is lower than the voltage Vg1, the balancing FET 148-n of the cell 19-n concerned is turned off.

According to the process of steps S23 to S25, the equalizing function is activated to the cell of which the cell voltage is higher than or equal to the predetermined cell voltage Vg1, which causes the cell concerned to forcibly discharge and the voltage across electrodes (a state of charge) is reduced. Thereby, a variation in the cell voltage generated by a variation in the deterioration of the cell concerned is equalized. It should be noted that the equalizing function is not activated to the cell of which cell voltage is lower than the cell voltage Vg1, and the forcible discharge is not performed.

Moreover, if it is determined in step S22 that the balancing start instruction signal is not ON, the process proceeds to step S26. In step S26, it is determined whether the cell voltage Vn of each cell 19-n is higher than or equal to a voltage Vf1 at which the balancing FET 148-n is forcibly turned on. This determination condition is set to a condition F. Here, the voltage Vf1 is set to a value higher than the voltage Vg1 used in step S23. On the other hand, the voltage Vg1 is within a voltage range at a time of use, and is set to a voltage lower than the voltage Vf1.

If it is determined in step S26 that the condition F has been established, the process proceeds to step S27. In step S27, the balancing FET 148-n provided to the cell 19-n for which the condition F has been established is turned on to cause the cell 19-n concerned to discharge. On the other hand, if it is determined in step S26 that the condition F has not been established, the balancing FET 148-n provided to the cell 19-n for which the condition F has not been established is turned off so that a discharge of the cell 19-n concerned is not performed.

According to the process of steps S26 to S28, the cell having the cell voltage Vn higher than or equal to the previously set voltage Vf1 is caused to forcibly discharge, and the voltage of the cell is decreased to a predetermined cell voltage.

After the process of steps S24, S25, S27 and S28 is ended, the process returns to step S22. Additionally, if the key-off is made, the balancing process is interrupted. Further, because the capacitance of each cell can be measured using the present invention, a replacement time can be estimated for each cell. Further, when an abnormality occurs in the electric accumulator, the abnormal cell can be identified individually, and, therefore, a maintenance cost when a replacement is made can be reduced.

The information regarding the cell voltage is maintained to the latest voltage information when the operation of the shovel is stopped (key-OFF), and includes the maximum value of the cell voltage, the minimum value of the cell voltage, an average value of the cell voltage, etc. Additionally, the information regarding the capacitance includes a value of the capacitance, the maximum value of the cell temperature, the minimum value of the cell temperature, an average value of the cell temperature, etc.

Figure 11:
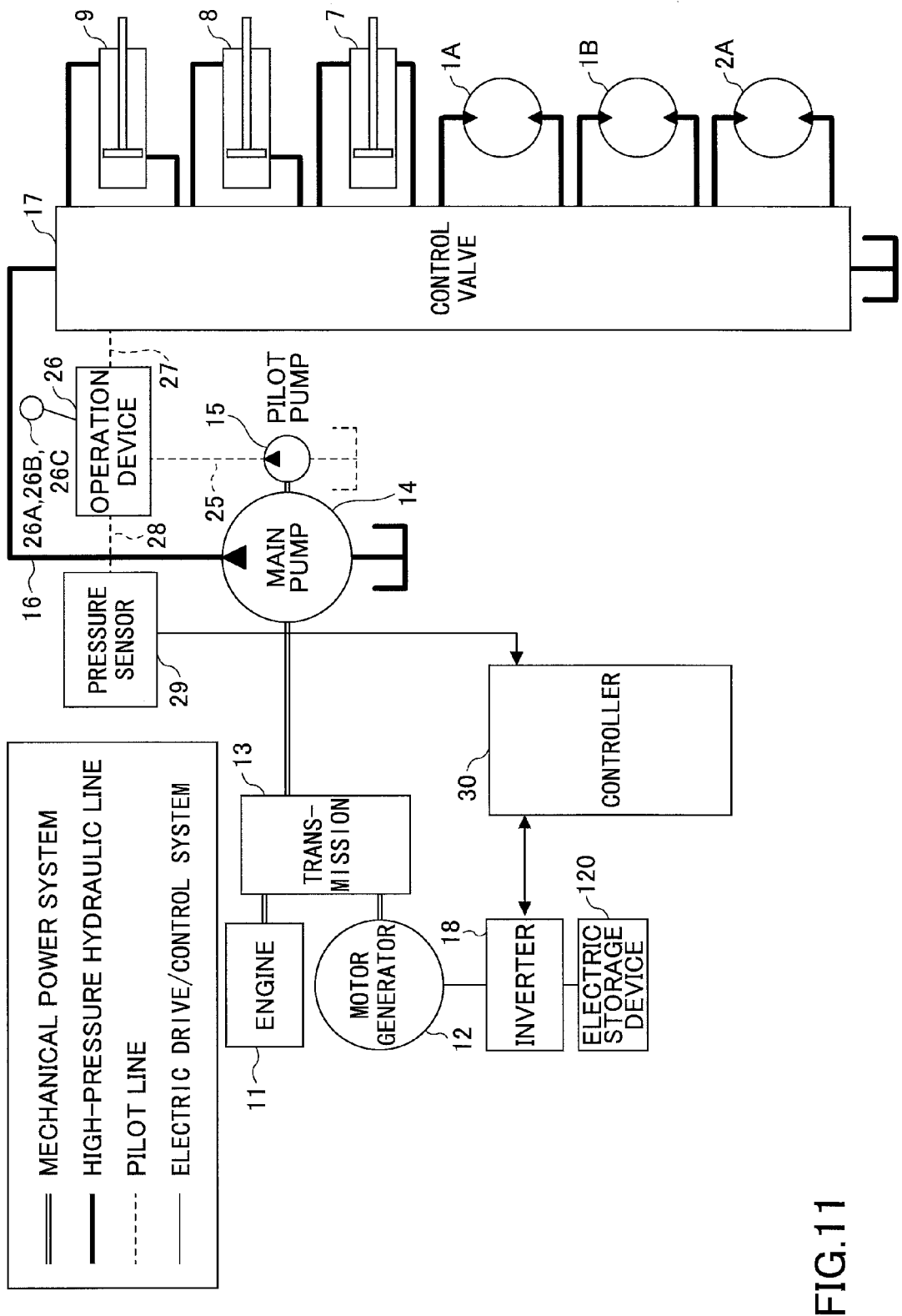
FIG. 11 is a block diagram illustrating a configuration of a drive system of a shovel configured to drive a turning mechanism by a turning hydraulic motor.

Additionally, although the turning mechanism 2 is electrically driven type in the above-mentioned embodiment, there may be a case where the turning mechanism is a hydraulically driven type. FIG. 11 is a block diagram illustrating a structure of a drive system in a case where the turning mechanism of the hybrid shovel illustrated in FIG. 2 is changed to a hydraulically driven type. In the shovel illustrated in FIG. 11, a turning hydraulic motor 2A is connected to the control valve 17 instead of the turning electric motor 21 so that the turning mechanism 2 is driven by the turning hydraulic motor 2A. Even the shovel having such a structure is capable of measuring a capacitance of each electric storage cell individually by activating the equalizing circuit by ON/OFF of the switching circuit for a cell having a voltage higher than or equal to a predetermined value in the electric accumulator as explained in the embodiment mentioned above. Then, based on the measured capacitance, the equalizing function can be activated for the cell only when it is needed. Accordingly, an electric power forcibly discharged by the equalizing function can be reduced, which can reduce a waste electric power consumption.

The present invention is not limited to the specifically disclosed embodiments using the above-mentioned shovel as an example, and various variations and modifications may be made without departing from the scope of the present invention.

What is claimed is:
1. A shovel comprising:
an engine generating a drive power;
a generator performing a generating operation using the drive power transmitted from the engine;
an electric accumulator having a plurality of electric storage cells in which an electric power generated by the generator is accumulated, the electric accumulator supplying an electric power to an electric load of the shovel;
an electrostatic capacity computing unit configured to compute an electrostatic capacity of each of the electric storage cells;
an equalizing circuit provided to each of the electric storage cells configured to equalize voltages of the electric storage cells by discharging electricity from the electric storage cells; and
a determination unit configured to determine whether to activate the electrostatic capacity computing unit and the equalizing circuit based on a predetermined condition of the electric storage cell, wherein
the electrostatic capacity computing unit is configured to separately discharge the electricity from each of the electric storage cells and to compute the electrostatic capacity of each of the electric storage cells based on a voltage of each of the electric storage cells while discharging the electricity, and wherein a temperature difference between a maximum temperature and a minimum temperature of the temperatures of the electric storage cells is computed when temperatures of all of the electric storage cells are higher than a predetermined temperature, and a transition is made to the process of computing electrostatic capacities of the electric storage cells based on the computed temperature difference.

2. The shovel as claimed in claim 1, wherein the determination as to whether to activate the equalizing circuit is made based on both a voltage of each electric storage cell and a degree of deterioration of each electric storage cell.

3. The shovel as claimed in claim 1, wherein each of the electric storage cells is a capacitor.

4. A shovel comprising:
an engine generating a drive power;
a generator performing a generating operation using the drive power transmitted from the engine;
an electric accumulator having a plurality of electric storage cells in which an electric power generated by the generator is accumulated, the electric accumulator supplying an electric power to an electric load of the shovel;
an electrostatic capacity computing unit configured to compute an electrostatic capacity of each of the electric storage cells; and
an equalizing circuit provided to each of the electric storage cells configured to equalize voltages of the electric storage cells by discharging electricity from the electric storage cells, wherein
a determination is made as to whether temperatures of the electric storage cells are higher than a predetermined temperature, and a transition is made to a process of computing electrostatic capacities of the electric storage cells based on a result of the determination, and wherein
a temperature difference between a maximum temperature and a minimum temperature of the temperatures of the electric storage cells is computed when temperatures of all of the electric storage cells are higher than a predetermined temperature, and a transition is made to the process of computing electrostatic capacities of the electric storage cells based on the computed temperature difference.

5. The shovel as claimed in claim 4, wherein a determination is made as to whether voltages of all of said electric storage cells are higher than a predetermined voltage, and a transition is made to the process of computing electrostatic capacities of the electric storage cells based on a result of the determination.

6. A shovel comprising:
an engine generating a drive power;
a generator performing a generating operation using the drive power transmitted from the engine;
an electric accumulator having a plurality of electric storage cells in which an electric power generated by the generator is accumulated, the electric accumulator supplying an electric power to an electric load of the shovel;
an electrostatic capacity computing unit configured to compute an electrostatic capacity of each of the electric storage cells;
an equalizing circuit provided to each of the electric storage cells configured to equalize voltages of the electric storage cells by discharging electricity from the electric storage cells, wherein
the electrostatic capacity computing unit is configured to separately discharge the electricity from each of the electric storage cells and to compute the electrostatic capacity of each of the electric storage cells based on a voltage of each of the electric storage cells while discharging the electricity, wherein
the equalizing circuit includes a switch and a discharge resistor, and
the electrostatic capacity computing unit causes the electricity to be discharged from the electric storage cells to the discharge resistor after forming a closed circuit with each of the electric storage cells and the discharge resistor by turning on the switch while computing the electrostatic capacity based on a voltage change over time of each of the electric storage cells during the discharge, and wherein
a temperature difference between a maximum temperature and a minimum temperature of the temperatures of the electric storage cells is computed when temperatures of all of the electric storage cells are higher than a predetermined temperature, and a transition is made to the process of computing electrostatic capacities of the electric storage cells based on the computed temperature difference.

7. The shovel as claimed in claim 6, wherein the equalizing circuit includes
a voltage detecting part configured to measure a voltage across terminals of each electric storage cell, and
an electrostatic capacity computing part including a time measuring part configured to measure a time for measuring the voltage across electrodes, and computes an electrostatic capacity of each electric storage cell based on a time at which a predetermined voltage drop is obtained when each of the electric storage cells is caused to discharge through the discharge resistor.

* * * * *